Figure 1:
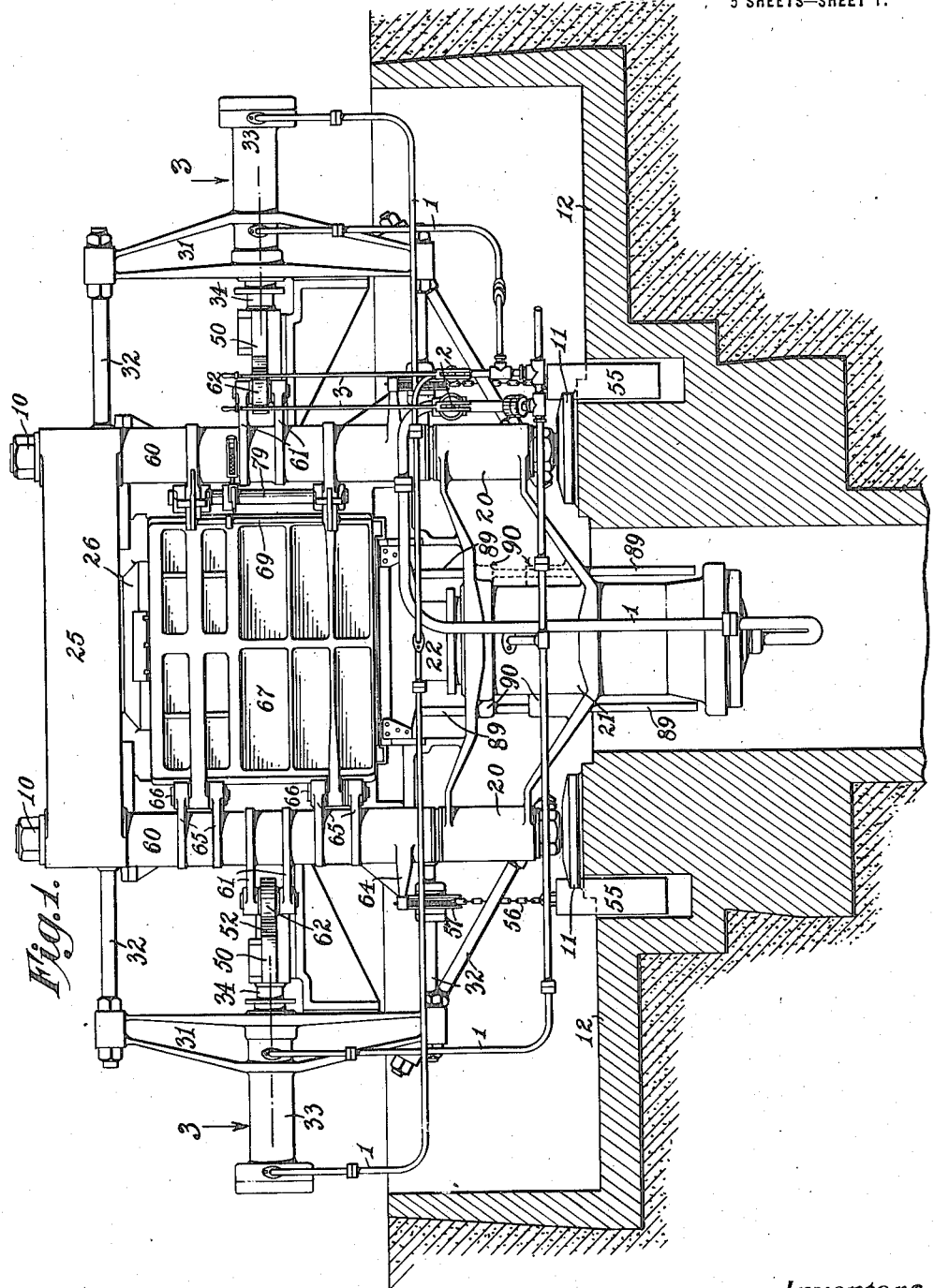

H. T. ROWLEY & F. SCHRANZ.
PRESS.
APPLICATION FILED MAR. 5, 1915.

1,221,767.

Patented Apr. 3, 1917.
5 SHEETS—SHEET 5.

Attest:

by

Inventors:
Horace T. Rowley
Frederick Schranz
Attÿs.

UNITED STATES PATENT OFFICE.

HORACE T. ROWLEY, OF NEW YORK, N. Y., AND FREDERICK SCHRANZ, OF CAMDEN, NEW JERSEY, ASSIGNORS TO STANDARD COMPRESS AND WAREHOUSE CORPORATION, OF RICHMOND, VIRGINIA, A CORPORATION OF VIRGINIA.

PRESS.

1,221,767.  Specification of Letters Patent.  Patented Apr. 3, 1917.

Application filed March 5, 1915. Serial No. 12,242.

*To all whom it may concern:*

Be it known that we, HORACE T. ROWLEY and FREDERICK SCHRANZ, citizens of the United States, residing, respectively, in the borough of Manhattan, city, county, and State of New York, and Camden, county of Camden, and State of New Jersey, have invented certain new and useful Improvements in Presses, fully described and represented in the following specification and the accompanying drawings, forming a part of the same.

This invention relates to improvements in presses, and particularly to presses for rebaling materials such as cotton.

Presses of this type are generally known as compresses, and are used for compressing plantation bales into smaller sizes of greater density for shipment or storage. In an apparatus comprising the present invention, the press has its platens and the strokes of the plungers operating the movable platens so proportioned with relation to the bale which is to be compressed, that the side platens of the compress will compress the bale to reduce one of its dimensions, while the ends of the bale are out of contact with any part of the press. By this construction, the cotton or other material is free to flow endwise and in a vertical direction under the transverse pressure due to the movement of the side platens of the compress. In other words, the construction of the apparatus is such that at the time the side platens of the compress are pressing inward on the plantation bale, there exists at each end of the bale and at its top a considerable open space within the pressing chamber into which the cotton at the ends of the bale and at the top may be protruded without projecting through any openings in the walls of the pressing chamber. Consequently, the end plungers of the compress may then move inward to compress the bale in a longitudinal direction, without danger of pinching the protruding cotton in any cracks, crevices or openings of the pressing walls. Thereafter the apparatus operates to press the bale in the direction of its third dimension while it is held by the side platens and end platens of the compress and their plungers.

By such a construction, the compressing apparatus may be materially simplified, since all devices usually employed for closing the openings in the pressing chamber prior to the movement of the side platens may be eliminated.

In the accompanying drawings there is shown one specific embodiment of the invention, in which are also embodied a number of features, details and combinations of parts constituting further inventions capable of application to presses other than those embodying the dimensioning and proportioning of the stroke of the platens, as described hereinbefore.

In the drawings—

Figure 2:
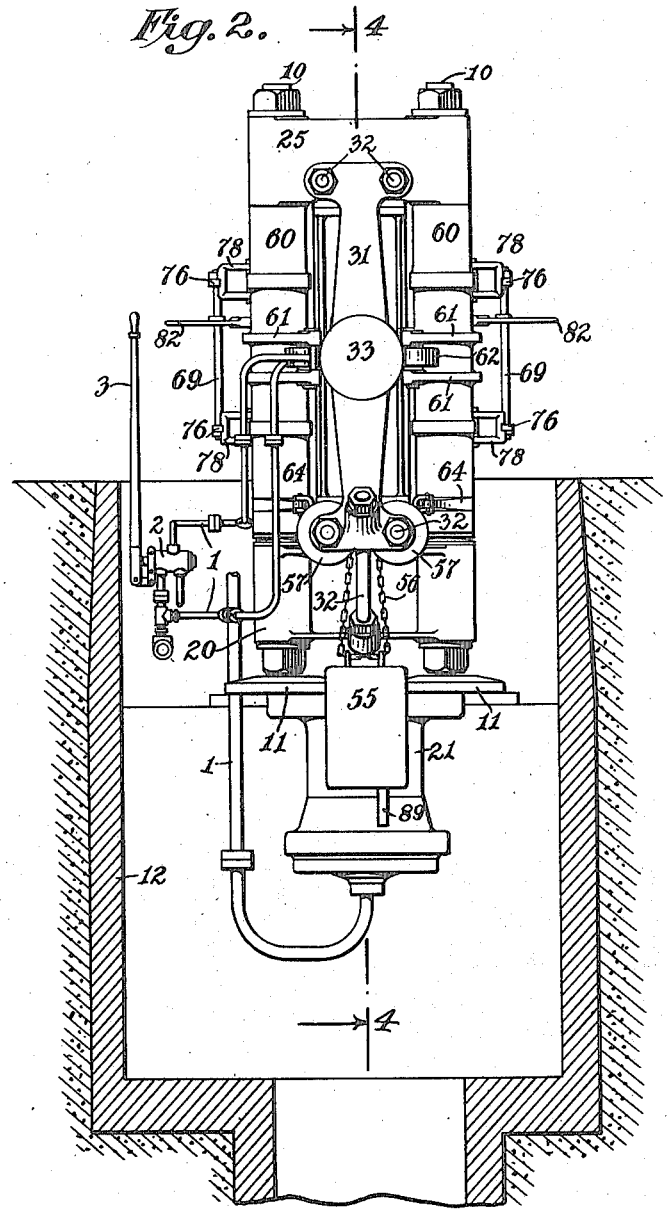
Figure 3:
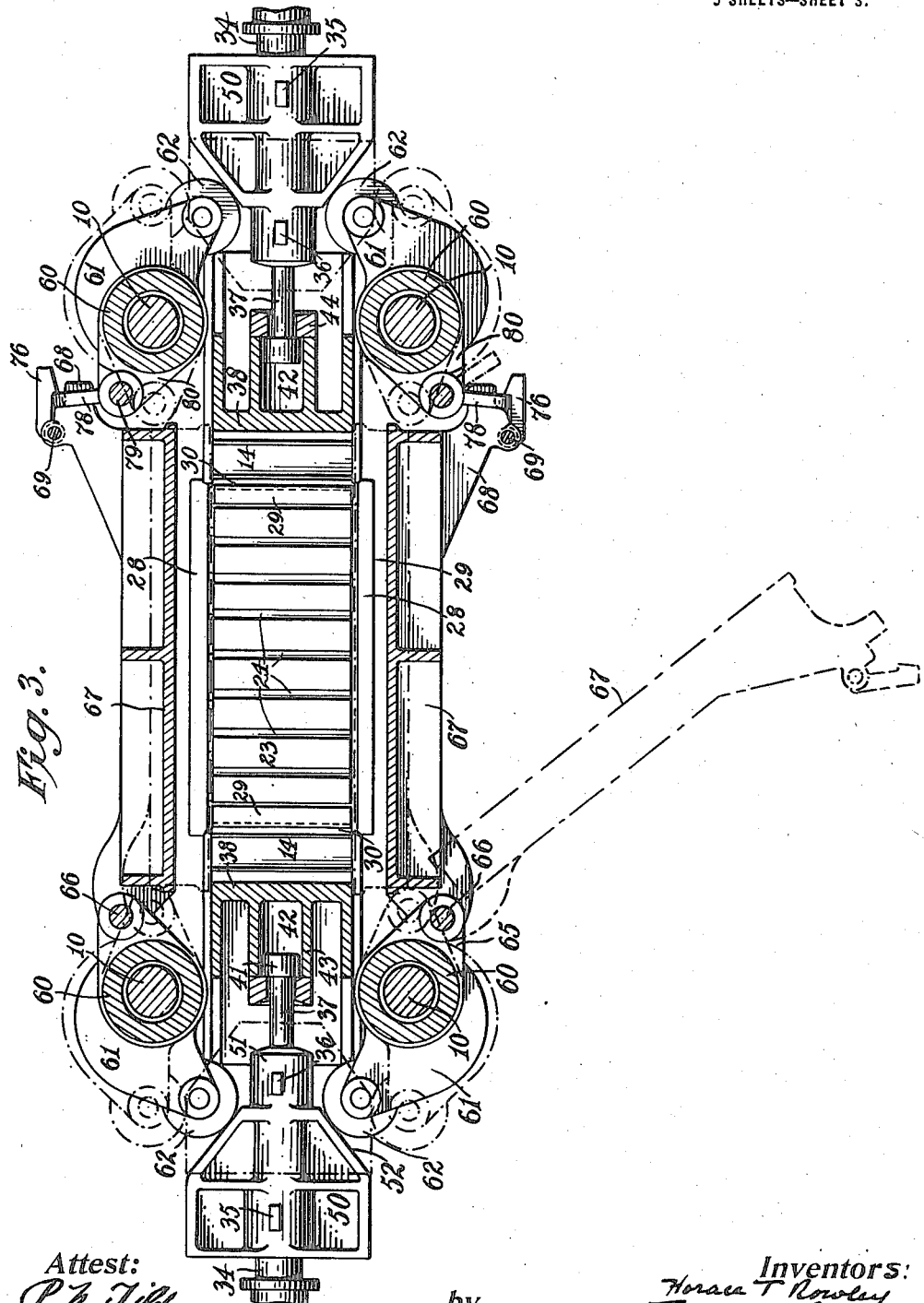
Figure 4:
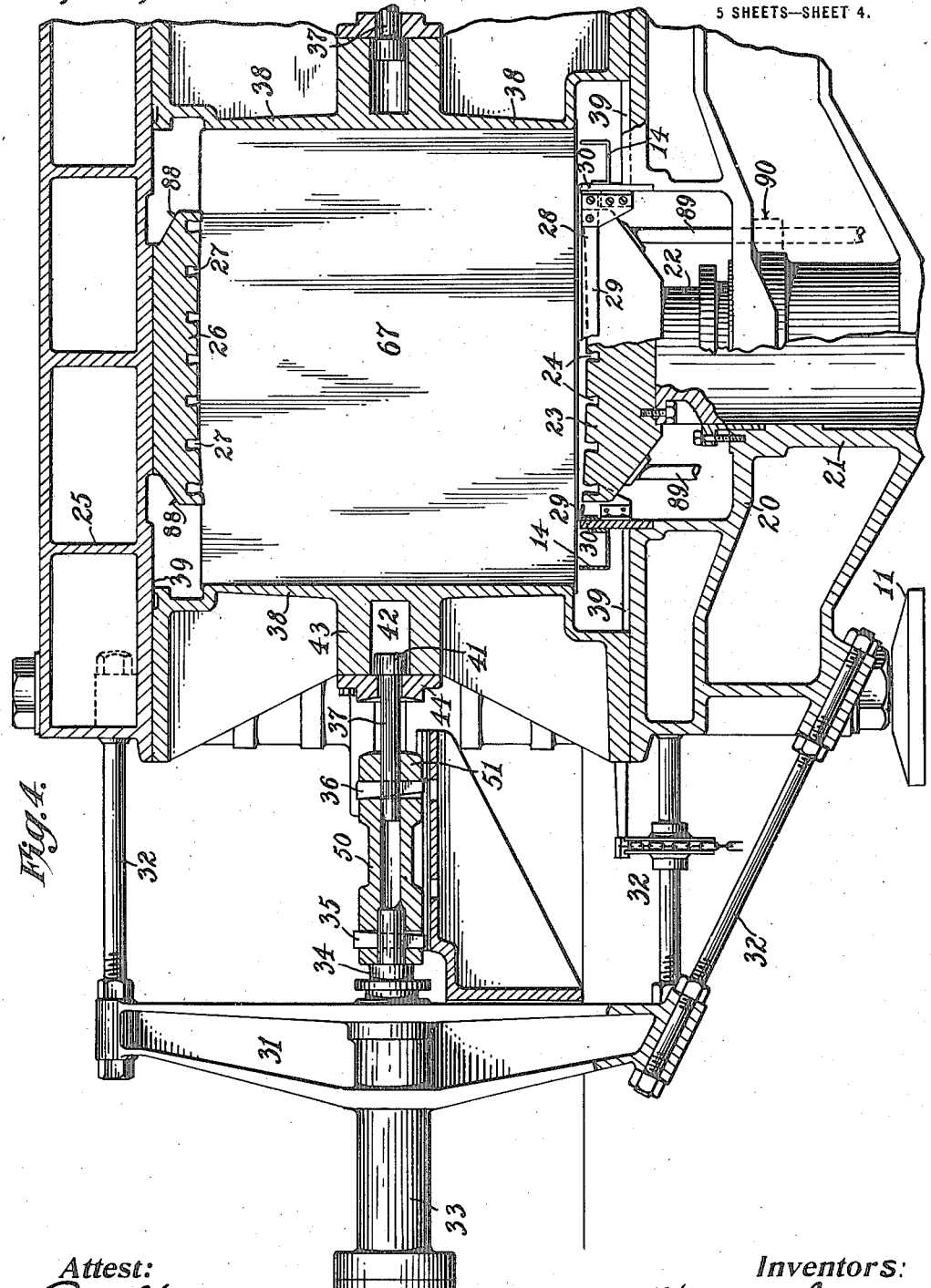
Figure 5:
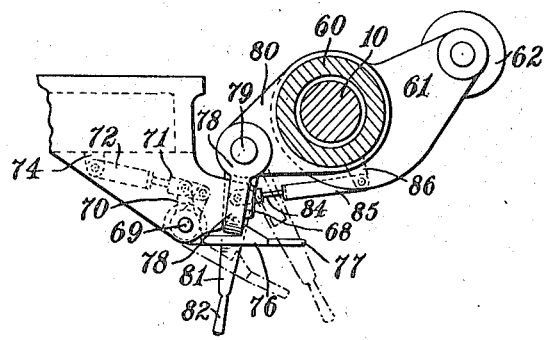
Figure 6:
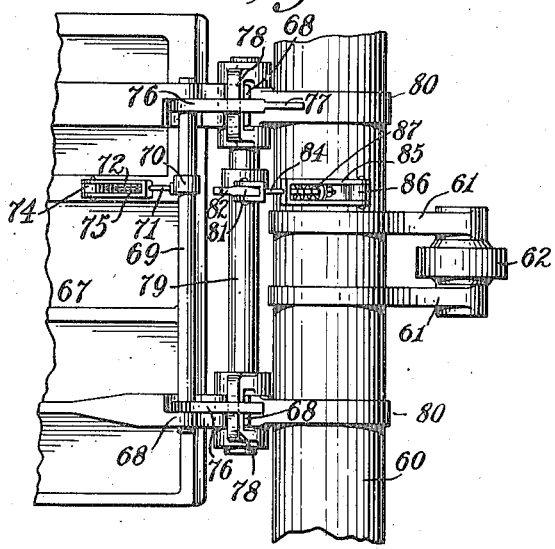

Figure 1 is a side elevation of a complete press with the base or foundation in section;

Fig. 2 an end elevation of the said press, also showing the foundation in section;

Fig. 3 a horizontal sectional view on the line 3—3, Fig. 1, looking in the direction of the arrows, the parts being shown on a scale slightly larger than that of Fig. 1;

Fig. 4 a detail, vertical longitudinal section approximately on the line 4—4 of Fig. 2, and Figs. 5 and 6 are detail views of the locking mechanism for the side doors.

Referring to the drawings, there are shown at 10 four upright columns, each having a foot-plate 11 mounted upon a base or foundation 12, which is suitably raised to accommodate the press and the various parts thereof. The columns 10 support a top casting or head 25 at the upper end of the press. Mounted upon the upright columns 10 at the lower ends thereof and adjacent to the foot-plates 11 is a casting 20, which carries a cylinder 21 in which operates a ram 22 that carries on its upper end a platen 23 having the usual parallel grooves 24 in which the bale bands are to be received.

At the top of the columns 10 there is mounted a casting 25, which has secured to its under side a platen 26 provided with grooves 27 which are in vertical alinement with the grooves 24 in the lower movable platen 23, the function of the grooves 27 being the same as that of the grooves 24 (see Fig. 4). At the top of the lower casting 20 there is mounted a rectangular frame surrounding the platen 23. In the present example this frame is shown as composed of angle irons 28 and 29, the latter being secured to end plates 30 which are fastened to the casting 20 in any suitable manner. The angle irons 29 have their top portions slightly inclined downwardly and inwardly toward the platen 23, and the face of the platen 23 is slightly dished or concaved in two directions for a purpose presently to be explained. There is also secured to the plates 30 a trough device 14, which is intended to support the projecting ends of the burlap or bale cover before the bale is tied and while the compression is going on.

At each end of the press there is mounted between the top casting 25 and the bottom casting 20 a cross head 31 which is secured to the castings 25 and 20 by any suitable means, such, for example, as rods 32. Each cross head 31 has formed integral therewith a cylinder 33 in which operates a ram 34, to which is secured, as by means of a pin 35, a cam plate 50 hereinafter to be described. Each cam plate 50 is further connected as by means of a pin 36 to a rod 37, which latter is in turn loosely secured to an end pressure plate 38, there being two of these pressure plates 38, one at each end of the press, slidably mounted on ways 39 between the castings 25 and 20. Preferably, the design of the end pressure plates is as shown in Fig. 4, recess portions being provided to allow for the trough 14 and the ends of the platen 26, so that the end pressure plates may be brought as close together as possible. The end pressure plates 38 are intended to have a stroke somewhat shorter than that of the impelling rams 34 and cam plates 50, and in order to provide for this lost motion the rod 37 has at its inner end a head or knob 41 which slides within the corresponding cylindrical recess 42 in a hub 43 on the outer face of each end pressure plate 38. The head is held in the recess by means of a cap 44 secured to the hub 43, as shown in Fig. 4. Each cam plate 50 has a cylindrical extension 51 which is adapted to abut against the cap 44 to drive the end pressure plate 38 forward. In accomplishing the return movement of each end pressure plate 38, the head 42 strikes the inner side of the cap 44. It is obvious that with the construction described the end pressure plates 38 will move a shorter distance in each direction than will the cam plates 50 and the rams 34. The mechanism thus far described constitutes the means for compressing the cotton or other material vertically and also horizontally in one direction, that is to say, lengthwise of the bale. Compression of the bale in the other horizontal direction, that is to say, from side to side of the bale, is accomplished by the mechanism now to be described.

Referring more especially to Figs. 1 and 3 of the drawings, there is seen on each of the left hand columns 10 a sleeve 60 rotatable upon the columns between the castings 20 and 25. Each sleeve 60 is provided with arms 61, carrying at its end a roller 62 adapted to bear against the inclined surfaces 52 on the cam plate 50. Each roller 62 is held in contact with its appropriate cam surface 52 of the cam member 50 by means of a weight 55 suspended from a chain 56 which runs over a sheave 57 mounted on the rod 32, the end of the chain 56 in each case being fastened to an arm 64 on the sleeve 60. On the right hand pair of columns 10 there are also mounted sleeves 60 each having an arm 61, a roller 62 and arms 64 attached to a chain 56 which runs over a sheave 57 and is connected to a weight 55. Up to this point the right and left hand pairs of sleeves are similar. On each of the left hand sleeves 60 there are two pairs of integral arms 65 which carry pintle pins 66 on which is hinged a side door 67, which is adapted to swing outwardly into the position shown by broken lines in Fig. 3, thus affording access to the press for the introduction of the cotton and the removal of the pressed bale. When the side doors 67 are closed they are in a position at right angles to the end pressure plates 38. Means for locking the side doors in this position, and for moving them in the operation of compressing the bale transversely while retaining the angular relation between the end plates and the side doors are provided, as follows: On the right hand, or locking end, of each of the side doors 67, there is formed, near the top and bottom, a pair of lugs 68, in which is mounted a rock shaft 69 carrying an inwardly projecting arm 70 keyed to the shaft. A rod 71 having a bifurcated end, is pivoted to the end of the arm 70 (Fig. 6), while the end of the rod extends through an aperture in the end of a U-shaped strap 72 that is pivoted to a lug 74 on the door 67, a coiled spring 75 being interposed between a nut on the end of the rod 71 and the bottom of the U-shaped strap 72. At the top and bottom of each rock shaft 69, and keyed thereto, is a pair of latches 76, the upper one of which terminates in a handle 77. The latches 76, the rock shaft 69 and the arm 70 constitute a bell-crank-lever which may be rocked by manipulation of the handle 77 against the tension of the spring 75. The ends of the lugs 68 project in the path of a pair of clevises 78 which are keyed to a rock shaft 79 pivotally mounted in a pair of arms 80 integral with the sleeves 60 on the right hand columns 10. Between the clevises 78, and keyed to the rock shaft 79 there is mounted an arm 81 terminating in a handle 82. A rod 84 having a bifurcated end is pivoted to the arm 81, while the end of the rod projects through an aperture in the bottom of a U-shaped strap 85 which is pivoted to a lug 86 on said sleeve 60. A spring 87 is interposed between a nut on the end of the rod 84 and the bottom of a U-shaped strap 85.

When either of the side doors 67 of the press is open, as shown in broken lines in Fig. 3, the clevises 78 are in the alternate position shown in broken lines in that figure, being held there by the spring 87. The side door may then be manually swung on the pintles 66 into a closed position, and the clevises 78 are locked into position to engage the lugs 68 on the end of the door 67, where they are held by the operator against the tension of the spring 87 by means of the arm 81, terminating in the handle 82. As the clevises 78 swing into position over the ends of the lugs 68, they ride along the inclined surfaces of the latches 76 and swing them outward until the latches hook over the clevises to lock them in place, the latches being held in this position by the spring device 75, which tends to rotate the rock-shaft 69 in the proper direction. Whenever it is desired to unlock the side doors, the operator grasps the handle 77 and draws the latches 76 outward to release the clevises 78, which are then pulled off the lugs 68 by the action of the spring 87.

Suitable hydraulic connections for the apparatus are shown in Figs. 1 and 2, where they are indicated by the numeral 1, and these hydraulic connections are provided with suitable valves 2 and controlling levers 3.

In the operation of the press, the side doors are swung open, suitable bale ties are introduced into the grooves 24 and 27 in the platens 23 and 26, respectively, and a bale covering of burlap or the like is then hung from pins 88 on the upper side of the platen 26. The cotton to be pressed is then put into position, resting upon another section of burlap or covering which is spread over the lower platen 23, with its projecting ends supported by the trough 14. Being held up by the trough 14, the projecting ends of the lower covering can not come in contact with oil or grease which might be upon the ways 39. The side doors 67 are then closed and locked, as shown in full lines in Fig. 3, and thereafter, by the proper manipulation of the hydraulic control levers 3, pressure is first applied to the end rams 34, which move forward, carrying with them the cam members 50, the inclined surfaces 52 of which engage the rollers 62 on the arms 61, causing the sleeves 60 to rotate about the columns 10, so that the side doors 67 are moved into a compressing position as indicated in dotted lines in Fig. 3. When the rams 34 have made a part of their full stroke, the extensions 51 on the cam members 50 come in contact with the caps 44 on the ends of the pressure plates 38 and drive the latter forward into a pressing position. Hydraulic pressure is next introduced behind the vertical ram 22, which moves the platen 23 upwardly, compressing the bale in a vertical direction between platens 23 and 26, thus completing the compression. In order to prevent the ram 22 and the platen 23 from turning, there is provided a pair of rods 89 depending from the platen 23 and projecting through guides 90 in the bottom casting 20.

The bale having been formed, the end doors and side doors are drawn back, when the side doors 67 may be unlocked and swung open, the bale ties adjusted and secured, and the pressure on the vertical rams released, which will permit the bale to rest on the rectangular frame 28, and since this is level with the floor line the bale may be readily removed from the press. The importance of providing the concaved lower and upper platens is in the fact that by this particular arrangement the danger of having the ends of the bale stick out between the platens and the end pressure plates during closing is minimized, it being understood that the press is principally intended for rebaling, which means that a previously formed bale is placed in position in order that its dimensions may be further reduced and its symmetry impressed. With the concaved lower platen, the ends of such a previously formed bale will project well above the lower line of the end pressure plates 38, as will be obvious.

It will be seen that the proportions of the pressing chamber are such that the ordinary plantation bale to be compressed will not have a length as great as the side platens 67, so that as the side platens are brought against the bale and compress it, any lengthening of the bale due to this compression will not bring the protruding ends in contact with the platens 38, or, at most, will not reach and touch said platens 38 until the side platens are in their full inward positions. At this time, the side platens contact with the sides of the end platens 38, and hence there is no opening through which the cotton could protrude. Furthermore, as the end platens 38 have a large, flat bearing surface riding in close contact with the side platens 67, the bale can be compressed endwise at a considerable pressure with no danger of escape of cotton between the platens 38 and the platens 67. The bale is operated on in a pressing chamber which is closed at the time the platens 38 and 23 are acting upon the bale, while at the same time the complexities of structure involved in the use of collapsible end plates or the like is avoided.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

What is claimed is:

1. In a compress, the combination with a pair of end platens arranged to be separated to a maximum distance materially greater than the length of the bale to be compressed, the width of said end plates being substantially that of the compressed bale, and a pair of side platens each having a length greater than the distance between the end platens when separated to the maximum distance, of means for first moving the side platens toward each other into contact with the sides of the end platens while the latter are at said maximum distance apart, means for thereafter moving the end platens toward each other to a minimum distance apart while in contact with the side platens, a main platen arranged to enter and fill the space between the side platens and end platens while the latter are at their respective minimum distances apart, and means for moving said main platen to compress the bale after the side and end platens have compressed it.

2. In a compress, the combination with a pair of end platens arranged to be separated to a maximum distance materially greater than the length of the bale to be compressed, the width of said end plates being substantially that of the compressed bale, and a pair of side platens each having a length greater than the distance between the end platens when separated to the maximum distance, of means for first moving the side platens toward each other into contact with the sides of the end platens while the latter are at said maximum distance apart, means for thereafter moving the end platens toward each other to a minimum distance apart while in contact with the side platens, a main platen arranged to enter and fill the space between the side platens and end platens while the latter are at their respective minimum distances apart, said main platen having a concaved pressing surface, and means for moving said main platen to compress the bale after the side and end platens have compressed it.

3. In a compress, the combination with a pair of end platens, a pair of side platens, a pair of plungers each loosely connected to the corresponding end platens, and heads provided with cam surfaces secured to each plunger, of angularly movable members each provided with arms arranged to be actuated by the corresponding cam surfaces, and connections between the angularly movable members and the side platens whereby the side platens are moved by said angularly movable members.

4. In a compress, the combination, with a pair of side platens, of angularly movable platen-operating members arranged to engage each end of said side platens and to move them toward and from each other, and power means for operating said angularly movable members.

5. In a compress, the combination, with a side platen, a pair of angularly movable platen-operating members to one of which one end of said side platen is hinged, means for detachably connecting the other end of the side platen to the other angularly movable member, and power means for swinging the angularly movable members, whereby the side platen is moved.

6. In a compress, the combination, with a side platen provided with pintles at one end and projecting arms at the other end, of an angularly movable member arranged to carry the pintles, a second angularly movable member, clevises pivoted thereto and arranged to engage the projecting arms on the side platen, means for operating the angularly movable members, and latch mechanism for holding the clevises in engagement with the projecting arms.

7. In a compress, the combination, with a side platen provided with pintles at one end and projecting arms at the other end, of an angularly movable member arranged to carry the pintles, a second angularly movable member, clevises pivoted thereto and arranged to engage the projecting arms on the side platen, yielding means tending to hold said clevises out of engaging position, means for operating the angularly movable members, and latch mechanism for holding the clevises in engagement with the projecting arms.

8. In a compress, the combination, with a side platen provided with pintles at one end and projecting arms at the other end, of an angularly movable member arranged to carry the pintles, a second angularly movable member, clevises pivoted thereto and arranged to engage the projecting arms on the side platen, yielding means tending to hold said clevises out of engagement with said projecting arms, latch mechanism for holding the clevises in engagement with the projecting arms, means tending to hold said latch mechanism in locking position, and means for operating the angularly movable members.

9. In a compress, the combination, with an upper platen, and bagging-supporting means in proximity to said platen, of a lower platen, and bagging-receiving troughs adjacent thereto.

5. 10. In a compress, the combination, with a lower dished movable platen, of a frame surrounding the lower platen and arranged to support a bale in such way as to bend the bale ends slightly upward to prevent clogging.

11. In a compress, the combination, with a pair of side platens, a pair of end platens, and rams having plungers, of means actuated by said plungers for moving said side platens toward each other, and means actuated by said plungers for moving the end platens toward each other after the side platens have been moved.

In testimony whereof, we have hereunto set our hands in the presence of two subscribing witnesses.

HORACE T. ROWLEY.
FREDERICK SCHRANZ.

Witnesses as to signature of Horace T. Rowley:
   HOWARD M. WHITNEY,
   REBECCA ROSENTHAL.

Witnesses as to signature of Frederick Schranz:
   DAVID FREEDMAN,
   ALEX. BERKOVITZ.